(12) United States Patent
Takahashi et al.

(10) Patent No.: US 11,603,908 B2
(45) Date of Patent: Mar. 14, 2023

(54) SPEED REDUCER AND ECCENTRIC GEAR OF THE SAME

(71) Applicant: Nabtesco Corporation, Tokyo (JP)

(72) Inventors: Masahiro Takahashi, Tokyo (JP); Yuto Nakai, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 17/464,134

(22) Filed: Sep. 1, 2021

(65) Prior Publication Data

US 2022/0107005 A1 Apr. 7, 2022

(30) Foreign Application Priority Data

Oct. 5, 2020 (JP) .............................. JP2020-168404

(51) Int. Cl.
*F16H 1/32* (2006.01)
*F16H 57/023* (2012.01)

(52) U.S. Cl.
CPC ............. *F16H 1/32* (2013.01); *F16H 57/023* (2013.01); *F16H 2001/323* (2013.01); *F16H 2001/325* (2013.01)

(58) Field of Classification Search
CPC .... F16H 1/32; F16H 57/023; F16H 2001/323; F16H 2001/325; F16H 57/082
See application file for complete search history.

(56) References Cited

U.S. PATENT DOCUMENTS

| 8,403,789 B2 * | 3/2013 | Janek .................. F16H 1/32 |
| | | 475/116 |
| 10,184,547 B2 * | 1/2019 | Fecko ................. F16H 1/32 |

FOREIGN PATENT DOCUMENTS

| CN | 106402285 A | * | 2/2017 | |
| JP | 2016-205421 A | | 12/2016 | |
| JP | 2016205601 A | * | 12/2016 | ............... F16H 1/32 |

* cited by examiner

*Primary Examiner* — Sherry L Estremsky
(74) *Attorney, Agent, or Firm* — Pillsbury Winthrop Shaw Pittman, LLP

(57) ABSTRACT

A speed reducer according to one aspect of the present disclosure includes: an input gear; a plurality of spur gears configured to rotate in mesh with the input gear; one or more eccentric cams formed on each of a plurality of shafts, each of the plurality of shafts being coupled to corresponding one of the plurality of spur gears; and one or more eccentric gears each having a plurality of first through-holes and a plurality of second through-holes, each of the plurality of first through-holes rotatably supporting corresponding one of the one or more eccentric cams, the second through-holes being disposed adjacent to the first through-holes and formed asymmetrically as viewed from a direction of a central axis, and the one or more eccentric gear are configured to rotate eccentrically relative to a rotational axis of the input gear in conjunction with rotation of the one or more eccentric cams.

1 Claim, 2 Drawing Sheets

SPEED REDUCER AND ECCENTRIC GEAR OF THE SAME

TECHNICAL FIELD

The present disclosure relates to a speed reducer and its eccentric gear having an improved strength. This application is based on and claims the benefit of priority from Japanese Patent Application Serial No. 2020-168404 (filed on Oct. 5, 2020), the contents of which are hereby incorporated by reference in their entirety.

BACKGROUND

A speed reducer is known to receive rotational input from an input shaft coupled to a drive shaft of a motor or the like, perform a smaller number of rotations than the input shaft, and provide rotational output having an increased torque (see, for example, Japanese Patent Application Publication No. 2016-205421 ("the '421 Publication")). This speed reducer includes, for example, an input gear that receives a rotational drive force, a plurality of spur gears rotationally driven in mesh with the input gear, a plurality of shafts coupled to rotation shafts of the plurality of spur gears and having eccentric cams, an eccentric gear rotatably supporting the eccentric cams, and a case having inner teeth formed thereon the number of which is larger by at least one than the number of outer teeth formed on the eccentric gear.

Further, in this speed reducer, the eccentric gear has a plurality of first through-holes and a plurality of second through-holes formed therein. The plurality of first through-holes rotatably support the plurality of eccentric cams, and the plurality of second through-holes are disposed between the plurality of first through-holes. This speed reducer further includes a pair of discs and a plurality of coupling shafts. The pair of discs support opposite ends of the plurality of shafts, and the plurality of coupling shafts extends through the plurality of second through-holes and are supported at opposite ends thereof on a pair of rotation plates. In this speed reducer thus configured, the eccentric gear rotates eccentrically along the inner teeth of the case in conjunction with the rotation of the input gear.

In the speed reducer disclosed in the '421 Publication, the eccentric gear has thin portions having a small thickness formed between the second through-holes and the outer teeth of the eccentric gear. Therefore, in driving operation of the speed reducer in which the outer teeth and the inner teeth are in mesh with each other, a load may be imparted to the thin portions to deform the thin portions. When this causes the eccentric gear to be deformed, the number of the contact points between the outer teeth and the inner teeth is reduced. Therefore, in portions of the eccentric gear other than the thin portions deformed, a larger load is imparted to the contact portions between the outer teeth and the inner teeth. To increase a torque in a speed reducer, it is thus desirable to minimize the deformation of the eccentric gear to prevent concentration of the load on contact portions between the outer teeth and the inner teeth.

SUMMARY

One object of the aspects related to the disclosure is to provide a speed reducer and its eccentric gear having an increased gear strength and capable of providing an increased torque.

(1) A speed reducer according to one aspect of the present disclosure comprises: an input gear; a plurality of spur gears configured to rotate in mesh with the input gear; one or more eccentric cams formed on each of a plurality of shafts, each of the plurality of shafts being coupled to corresponding one of the plurality of spur gears; and one or more eccentric gears each having a plurality of first through-holes and a plurality of second through-holes, each of the plurality of first through-holes rotatably supporting corresponding one of the one or more eccentric cams, the plurality of second through-holes being disposed adjacent to the plurality of first through-holes and formed asymmetrically as viewed from a direction of a central axis, the one or more eccentric gears being configured to rotate eccentrically relative to a rotational axis of the input gear in conjunction with rotation of the one or more eccentric cams.

According to the disclosure, since the second through-holes are formed asymmetrically, it is possible to reduce the deformation of the eccentric gear occurring when a load caused by rotational drive is imparted. Also, it is possible to increase the torque.

(2) The plurality of second through-holes may have a thick portion disposed on one side in a circumferential direction of the one or more eccentric gears and having less opening than the other side, as viewed from the direction of the central axis.

According to the disclosure, the presence of the thick portion reduces the deformation of the meshing portion of the eccentric gear occurring when a load caused by rotational drive is imparted.

(3) The speed reducer may further comprise: a first disc and a second disc rotatably supporting opposite ends of the plurality of shafts; and a plurality of coupling shafts supported at opposite ends thereof on the first disc and the second disc and penetrating the plurality of second through-holes between the first disc and the second disc, The plurality of coupling shafts may have an asymmetrical section as viewed from an axial direction thereof.

According to the disclosure, since the coupling shafts have an asymmetrical section, it is possible to increase the strength of the coupling shafts and increase the output torque.

(4) An eccentric gear of a speed reducer according to an aspect of the disclosure has a plurality of first through-holes and a plurality of second through-holes, each of the plurality of first through-holes rotatably supporting corresponding one of a plurality of eccentric cams, the plurality of second through-holes being disposed adjacent to the plurality of first through-holes and formed asymmetrically as viewed from a direction of a central axis, and the eccentric gear is configured to rotate eccentrically in conjunction with rotation of the plurality of eccentric cams.

According to the disclosure, since the second through-holes are formed asymmetrically, it is possible to reduce the deformation of the eccentric gear occurring when a load caused by rotational drive is imparted. Also, it is possible to increase the torque.

In the speed reducer according to the present disclosure, it is possible to increase the strength of the gears and increase the torque.

DESCRIPTION OF THE PREFERRED EMBODIMENTS

Figure 1:
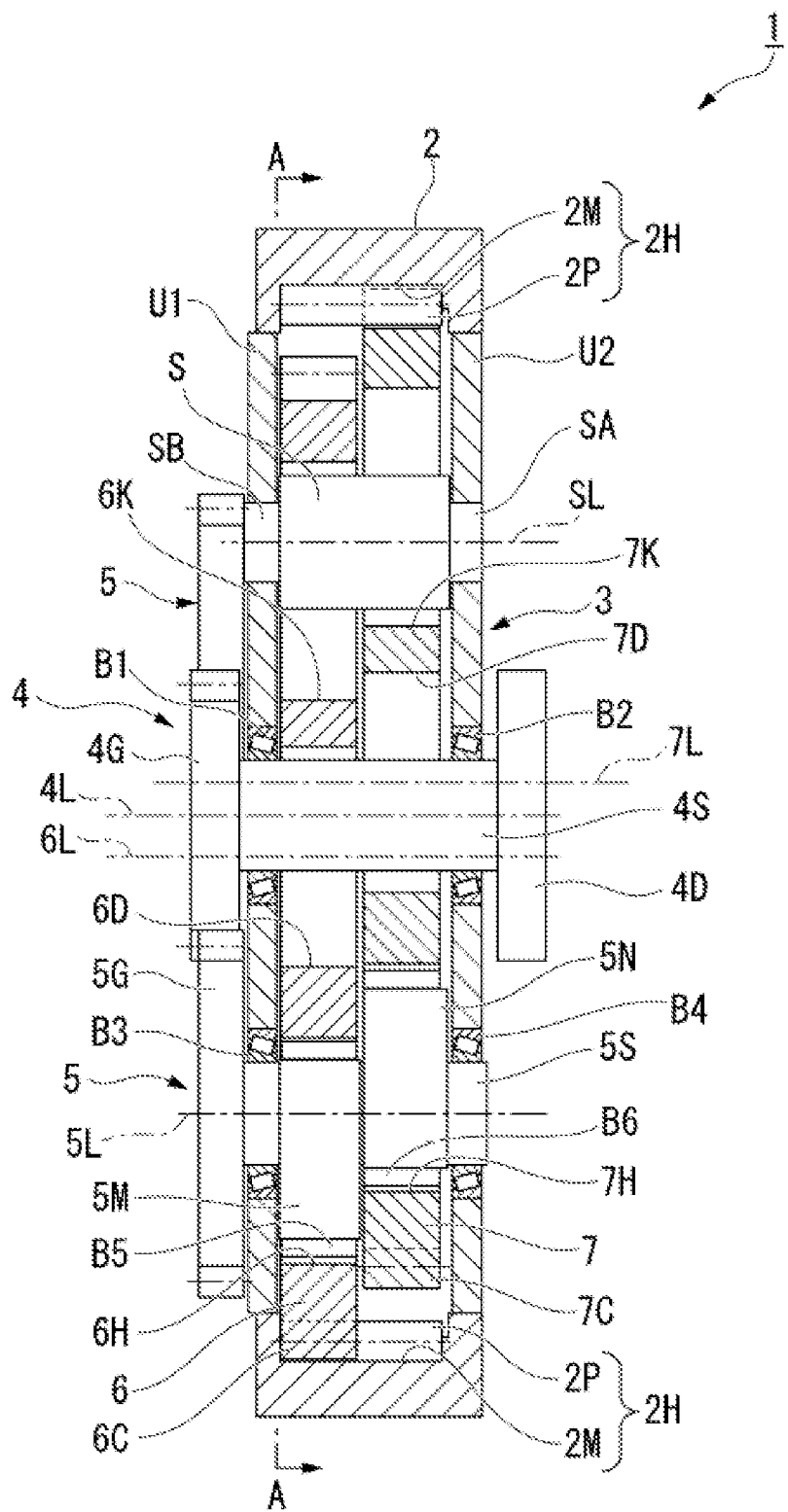
FIG. 1 is a lateral sectional view of a speed reducer according to an embodiment of the disclosure, as viewed along the line B-B in FIG. 2.
Figure 2:
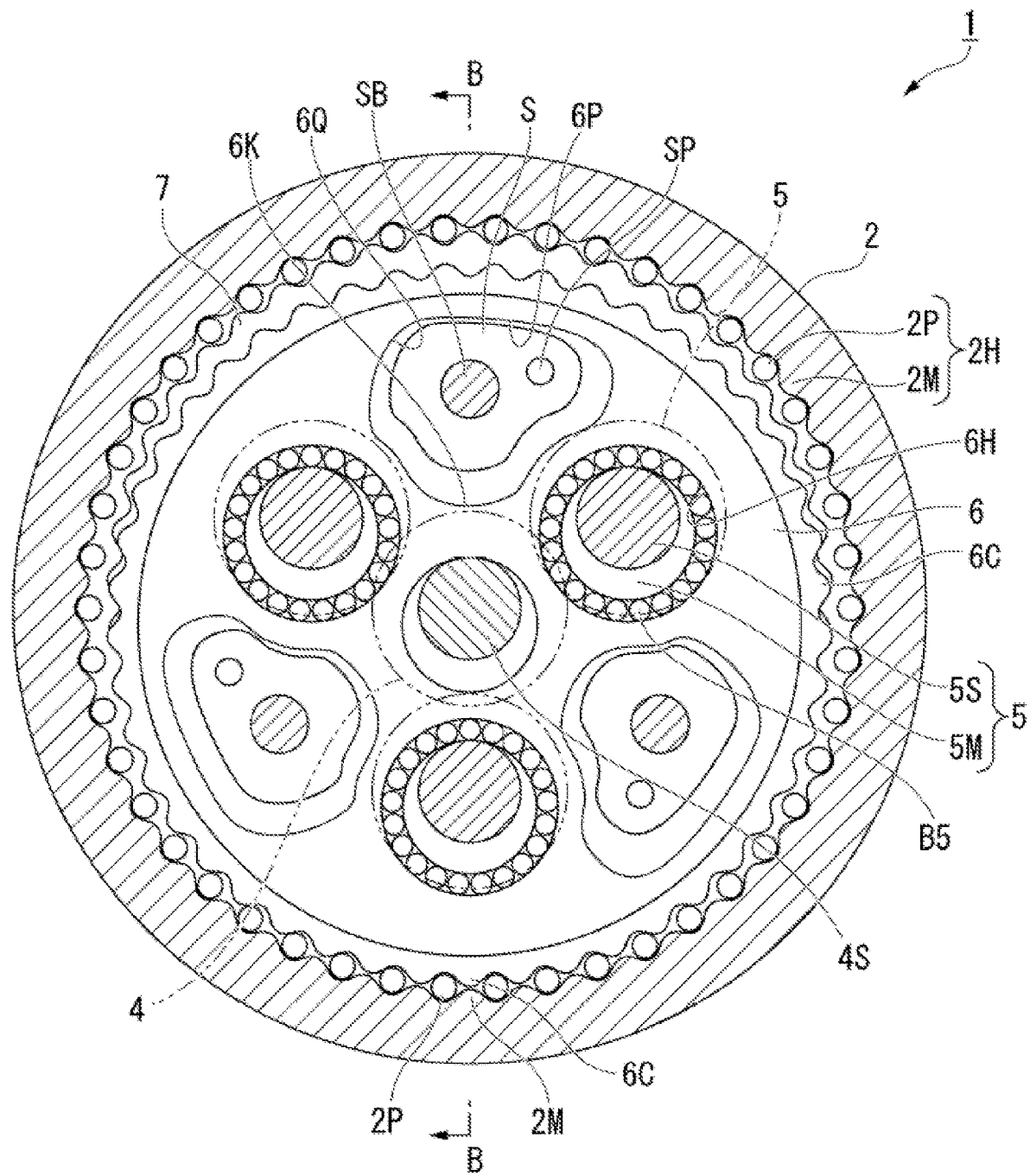
FIG. 2 is a front sectional view of the speed reducer, as viewed along the line A-A in FIG. 1.

As shown in FIGS. 1 and 2, the speed reducer 1 includes a case 2 having a cylindrical shape and a speed reducing mechanism 3 provided in the case 2. In the inner peripheral surface of the case 2, inner teeth 2H are formed. The inner teeth 2H are constituted by a plurality of pins 2P shaped like a circular column and a plurality of pin grooves 2M supporting the plurality of pins 2P, respectively. The plurality of pin grooves 2M have a substantially semicircular section. As viewed in the direction of the central axis of the case 2, the plurality of pin grooves 2M are arranged along the inner peripheral surface of the case 2.

The pin grooves 2M extend along the central axis in the inner peripheral surface of the case 2. Each of the pins 2P is in contact with associated one of the pin grooves 2M along the axial direction. As viewed in the direction of the central axis of the case 2, the plurality of pins 2P are disposed in the plurality of pin grooves 2M, respectively. With this configuration, as viewed from the central axis, the inner teeth 2H made of the plurality of pins 2P are formed in the inner peripheral surface of the case 2.

The speed reducing mechanism 3 includes an input gear 4 that receives a rotational driving force input thereto. The input gear 4 includes, for example, a coupling plate 4D that receives rotation input thereto, a first shaft 4S coupled to the coupling plate 4D, and a first gear 4G coupled to the first shaft 4S. The rotational driving force may be input to the first gear 4G side, instead of the coupling plate 4D side. The coupling plate 4D is shaped like a disc, for example. The coupling plate 4D is coupled to a rotational shaft of a drive unit formed of a motor (not shown). The coupling plate 4D and one end side of the first shaft 4S are coupled together coaxially with the axis 4L of the first shaft 4S.

The first shaft 4S is shaped like a circular column. The first shaft 4S is rotatably supported via bearings at the center of the first disc U1 and the second disc U2 each shaped like a disc. The first gear 4G shaped like a disc is coupled to the other end side of the first shaft 4S. The first gear 4G has a number of spur teeth. In the input gear 4, for example, the first gear 4G side of the first shaft 4S is supported on the first disc U1 via the bearing B1. The bearing B1 is, for example, a roller bearing. However, the bearing B1 is not limited to the roller bearing but may be other types of bearings (the same applies hereinafter).

In the input gear 4, for example, the coupling plate 4D side of the first shaft 4S is supported on the second disc U2 via the bearing B2. As described above, examples of the bearing B2 include a ball bearing and a roller bearing, as with the bearing B1. A plurality of spur gears 5 mesh with the input gear 4. In the embodiment, three spur gears 5 are arranged around the input gear 4 at regular intervals. However, the number of the spur gear 5 is not limited to three but may be larger than three.

When the input gear receives the rotational driving force input thereto and rotates, the three spur gears rotate. The rotational driving force is input not only to the input gear 4 side. The rotational driving force may be input to one of the three spur gears 5. In this case, the input gear 4 rotates in conjunction with rotation of the spur gear 5. Each of the spur gears 5 includes, for example, a second gear 5G meshing with the first gear 4G, a second shaft 5S coupled coaxially to the second gear 5G, and a first eccentric cam 5M and a second eccentric cam 5N formed on the second shaft 5S. The second shaft 5S is shaped like a circular column. One end side of the second shaft 5S is rotatably supported on the second disc U2 via the bearing B4. The other end side of the second shaft 5S is rotatably supported on the first disc U1 via the bearing B3.

The other end side of the second shaft 5S and the second gear 5G are coupled together coaxially with the axis 5L (rotational axis) of the second shaft 5S. The second gear 5G is shaped like a disc, for example. The second gear 5G has a number of spur teeth formed around a disc. When the second gear 5G is rotationally driven by the first gear 4G, the second shaft 5S rotates in conjunction with the rotation of the second gear 5G. The second shaft 5S has the first eccentric cam 5M and the second eccentric cam 5N formed integrally therewith. The first eccentric cam 5M and the second eccentric cam 5N are shaped like a circular column, for example. The first eccentric cam 5M is formed eccentrically such that its central axis is off the axis 5L of the second shaft 5S.

The second eccentric cam 5N is formed eccentrically such that its central axis is off the axis 5L of the second shaft 5S. The direction of eccentricity of the second eccentric cam 5N is opposite to that of the first eccentric cam 5M. The first eccentric cam 5M and the second eccentric cam 5N rotate in conjunction with the second shaft 5S coupled to the second gear 5G. The first eccentric cam 5M drives a first eccentric gear 6 disposed in the case 2.

The first eccentric gear 6 is shaped like a disc. The first eccentric gear 6 has a circular through-hole 6D formed at the central axis 6L of the first eccentric gear 6. The through-hole 6D has a larger diameter than the first shaft 4S. The through-hole 6D is penetrated by the first shaft 4S. The through-hole 6D has such a diameter that the first shaft 4S does not contact the first eccentric gear 6 when the first eccentric gear 6 rotates eccentrically, as will be described later.

The first eccentric gear 6 has outer teeth 6C formed along the outer periphery of the first eccentric gear 6. A part of the outer teeth 6C mesh with the inner teeth 2H formed along the inner peripheral surface of the case 2. For example, the number of the outer teeth 6C is smaller than that of the inner teeth 2H by one or more. The first eccentric gear 6 rotates eccentrically relative to the axis 4L (rotational axis) of the input gear 4. The first eccentric gear 6 does not slide but rolls along the inner peripheral surface of the case 2 with a part of the outer teeth 6C meshing with the inner teeth 2H, and thus the first eccentric gear 6 rotates eccentrically.

The first eccentric gear 6 has, for example, three first through-holes 6H that rotatably support three first eccentric cams 5M, respectively. Each of the first through-holes 6H has a circular opening. The first eccentric cam 5M is rotatably supported in the first through-hole 6H via a needle bearing B5. The first eccentric gear 6 has three second through-holes 6K disposed between the three first through-holes 6H. However, the number of the second through-holes 6K is not limited to three but may be larger than three depending on the number of the first through-holes 6H, for example.

The second through-holes 6K are disposed adjacent to the first through-holes 6H and formed asymmetrically as viewed from the direction of the central axis 6L of the first eccentric gear 6. The second through-holes 6K have a thin portion 6P formed of a region having a smallest thickness between the second through-holes 6K and the outer teeth 6C. The second through-holes 6K have a thick portion 6Q disposed on one side in the circumferential direction of the first eccentric gear 6 and having less opening than the other side.

In the first eccentric gear 6, the thin portion 6P tends to deform when undergoing a load caused by operation of the speed reducing mechanism 3. However, the first eccentric gear 6 of the embodiment includes the thick portion 6Q. Since the first eccentric gear 6 includes the thick portion 6Q formed therein, it is possible to reduce the deformation of the thin portion 6P occurring when a load caused by operation of the speed reducing mechanism 3 is imparted. Accordingly, the presence of the thick portion 6Q prevents that the number of the contact points between the outer teeth 6C and the pins 2P is reduced due to the deformation of the thin portion 6P.

Further, the presence of the thick portion 6Q prevents that the contact load of the pins 2P is increased in portions of the first eccentric gear 6 other than the thin portion 6P that tends to deform. Accordingly, the presence of the thick portion 6Q can increase the strength of the first eccentric gear 6 and thus allows the torque of the speed reducer 1 to be increased.

The second eccentric cam 5N drives a second eccentric gear 7 disposed in the case 2. The second eccentric gear 7 is shaped like a disc. The second eccentric gear 7 has a circular through-hole 7D formed at the central axis 7L of the second eccentric gear 7. The through-hole 7D has a larger diameter than the first shaft 4S. The through-hole 7D is penetrated by the first shaft 4S. The through-hole 7D has such a diameter that the first shaft 4S does not contact the second eccentric gear 7 when the second eccentric gear 7 rotates eccentrically, as will be described later. The second eccentric gear 7 has outer teeth 7C formed along the outer periphery of the second eccentric gear 7. A part of the outer teeth 7C mesh with the inner teeth 2H formed along the inner peripheral surface of the case 2. For example, the number of the outer teeth 7C is smaller than that of the inner teeth 2H by one or more. The second eccentric gear 7 rotates eccentrically relative to the axis 4L (rotational axis) of the input gear 4.

The second eccentric gear 7 does not slide but rolls along the inner peripheral surface of the case 2 with a part of the outer teeth 7C meshing with the inner teeth 2H, and thus the second eccentric gear 7 rotates eccentrically. The second eccentric gear 7 rotates in conjunction with the first eccentric gear 6, and it rotates eccentrically with its direction of eccentricity being opposite to that of the first eccentric gear 6. Since the second eccentric gear 7 and the first eccentric gear 6 rotate in conjunction with each other, the balance of the speed reducer 1 is maintained.

The second eccentric gear 7 has, for example, three first through-holes 7H that rotatably support three second eccentric cams 5N, respectively. Each of the first through-holes 7H has a circular opening. The second eccentric cam 5N is rotatably supported in the first through-hole 7H via a needle bearing B6. The second eccentric gear 7 has three second through-holes 7K disposed between the three first through-holes 7H. However, the number of the second through-holes 7K is not limited to three but may be equal to or larger than three depending on the number of the first through-holes 7H, for example.

The second through-holes 7K are disposed adjacent to the first through-holes 7H and formed asymmetrically as viewed from the direction of the central axis 7L of the second eccentric gear 7. The second through-holes 7K are formed in the same manner as the second through-holes 6K of the first eccentric gear 6. Specifically, the second through-holes 7K have a thin portion (not shown) formed of a region having a smallest thickness between the second through-holes 7K and the outer teeth 7C. Further, the second through-holes 7K have a thick portion (not shown) disposed on one side in the circumferential direction of the second eccentric gear 7 and having less opening than the other side.

In the second eccentric gear 7, the thin portion tends to deform when undergoing a load caused by operation of the speed reducing mechanism 3. However, the second eccentric gear 7 of the embodiment includes the thick portion. Since the second eccentric gear 7 includes the thick portion formed therein, it is possible to reduce the deformation of the thin portion occurring when a load caused by operation of the speed reducing mechanism 3 is imparted. Accordingly, the presence of the thick portion prevents that the number of the contact points between the outer teeth 7C and the pins 2P is reduced due to the deformation of the thin portion.

Further, the presence of the thick portion prevents that the contact load of the pins 2P is increased in portions of the second eccentric gear 7 other than the thin portion that tends to deform. Accordingly, the presence of the thick portion can increase the strength of the second eccentric gear 7 and thus allows the torque of the speed reducer 1 to be increased. The second through-holes 6K of the first eccentric gear 6 and the second through-holes 7K of the second eccentric gear 7 are penetrated by coupling shafts S. One end side of the coupling shafts S is coupled to the second disc U2 that rotatably supports one end side of the three second shafts 5S. The other end side of the coupling shafts S is coupled to the first disc U1 that rotatably supports the other end side of the three second shafts 5S. Three coupling shafts S are provided to correspond to the three second through-holes 6K, 7K.

Each coupling shaft S penetrates the second through-holes 6K, 7K, and one end SA side thereof projects from the second disc U2. One end SA side and the other end SB side of the coupling shaft S are shaped like a circular column in a sectional view in the direction of the axis SL. One end SA side of the coupling shaft S is supported on the second disc U2. The other end SB side of the coupling shaft S is supported on the first disc U1. In other words, the coupling shaft S is supported at opposite ends thereof on the first disc U1 and the second disc U2, and penetrates the second through-holes 6K, 7K between the first disc U1 and the second disc U2. The portion of the coupling shaft S other than one end SA side and the other end SB side is formed asymmetrically in a sectional view in the direction of the axis SL.

As viewed in the direction of the axis SL, the other end SB side of the coupling shaft S is positioned on the first disc U1 by a pin SP. As viewed in the direction of the axis SL, one end SA side of the coupling shaft S may be positioned on the second disc U2 by a pin SP.

Next, an operation of the speed reducer 1 will now be described. The speed reducer 1 may be varied in the method of inputting the rotational driving force and the method of outputting a rotational output, depending on the fixing method.

In the following description, it is supposed that the case 2 is fixed to a fixture object. When rotational power is input to the input gear 4, the first gear 4G rotates around the axis 4L in conjunction with the rotational power transmitted through the first shaft 4S. This causes the plurality of second gears 5G meshing with the first gear 4G to rotate around the axis 5L. The rotation of each second gear 5G causes the second shaft 5S to rotate. The rotation of the second shaft 5S causes the first eccentric cam 5M and the second eccentric cam 5N to rotate eccentrically around the axis 5L.

The rotation of the first eccentric cam 5M causes the first eccentric gear 6 to rotate eccentrically around the axis 4L along the inner peripheral surface of the case 2. Also, the rotation of the second eccentric cam 5N causes the second eccentric gear 7 to rotate eccentrically around the axis 4L along the inner peripheral surface of the case 2. The rotation of the second eccentric gear 7 is out of phase with the rotation of the first eccentric gear 6 by a half rotation. Further, the rotation of the first eccentric gear 6 and the second eccentric gear 7 causes the first disc U1 and the second disc U2 to rotate simultaneously around the axis 4L relative to the case 2. The number of rotations of the first disc U1 and the second disc U2 is smaller than that of the coupling plate 4D. The rotation of the first disc U1 and the second disc U2 causes the coupling shafts S to rotate around the axis 4L of the input gear 4.

Further, the rotation of the first disc U1 and the second disc U2 causes the plurality of spur gears 5 to revolve around the axis 4L. Also, the rotation of the first disc U1 and the second disc U2 causes the plurality of coupling shafts S to revolve around the axis 4L. At this time, each coupling shaft S moves relatively along the shape of the inner periphery of the associated second through-hole 6K of the first eccentric gear 6, without contacting with the inner periphery of the second through-hole 6K. Likewise, each coupling shaft S moves relatively along the shape of the inner periphery of the associated second through-hole 7K of the second eccentric gear 7, without contacting with the inner periphery of the second through-hole 7K.

In the following description, it is supposed that the coupling shafts S are fixed to a fixture object. When the first disc U1 and the second disc U2 are stopped in conjunction with each other and rotational power is input to the input gear 4, the plurality of spur gears 5 rotate around the respective axes 5L. The rotation of the plurality of spur gears 5 causes the first eccentric gear 6 and the second eccentric gear 7 to move eccentrically around the axis 4L. The eccentric movement of the first eccentric gear 6 and the second eccentric gear 7 causes the case 2 to rotate around the axis 4L relative to the first disc U1 and the second disc U2. The number of rotations of the case 2 is smaller than that of the input gear 4. Thus, with a rotation object to receive rotational output coupled to the case 2, it is possible to provide rotational output having a lower speed and a higher torque than the input gear 4.

As described above, in the speed reducer 1, the second through-holes 6K are formed asymmetrically as viewed from the direction of the central axis 6L and include the thick portion 6Q. Therefore, when the outer teeth 6C mesh with the inner teeth 2H, the deformation of the thin portion 6P can be inhibited, and thus the torque of the speed reducer 1 can be increased. Further, in the speed reducer 1, the coupling shafts S are formed asymmetrically as viewed from the direction of the respective axes SL, and thus the torque output from the coupling shafts S can be increased.

The present invention is not limited to the above embodiments but encompasses various modifications of the above embodiments not departing from the purport of the present invention. For example, the speed reducer 1 may include three or more coupling shafts S. In the speed reducer 1, the rotational driving force may be input to the spur gears 5, in addition to the input gear 4.

INDUSTRIAL APPLICABILITY

In the speed reducer according to the present disclosure, it is possible to increase the strength of the gears and increase the torque. Therefore, the present invention has industrial applicability.

What is claimed is:
1. A speed reducer comprising:
an input gear;
a plurality of spur gears configured to rotate in mesh with the input gear;
one or more eccentric cams formed on each of a plurality of shafts, each of the plurality of shafts being coupled to corresponding one of the plurality of spur gears;
one or more eccentric gears each having a plurality of first through-holes and a plurality of second through-holes, each of the plurality of first through-holes rotatably supporting corresponding one of the one or more eccentric cams, the plurality of second through-holes being disposed adjacent to the plurality of first through-holes and formed asymmetrically as viewed from a direction of a central axis, the one or more eccentric gears being configured to rotate eccentrically relative to a rotational axis of the input gear in conjunction with rotation of the one or more eccentric cams;
a first disc and a second disc rotatably supporting opposite ends of the plurality of shafts; and
a plurality of coupling shafts supported at opposite ends thereof on the first disc and the second disc and penetrating the plurality of second through-holes between the first disc and the second disc;
wherein the plurality of coupling shafts have an asymmetrical section as viewed from an axial direction thereof.

* * * * *